United States Patent
Shimada

(10) Patent No.: US 7,123,378 B2
(45) Date of Patent: Oct. 17, 2006

(54) IMAGE PROCESSING APPARATUS, METHOD AND PROGRAM ENABLING HIGH-PRECISION COLOR CONVERSION

(75) Inventor: Hirokatsu Shimada, Machida (JP)

(73) Assignee: Minolta Co., Ltd., Osaka (JP)

( * ) Notice: Subject to any disclaimer, the term of this patent is extended or adjusted under 35 U.S.C. 154(b) by 914 days.

(21) Appl. No.: 09/957,035

(22) Filed: Sep. 21, 2001

(65) Prior Publication Data

US 2002/0060798 A1 May 23, 2002

(30) Foreign Application Priority Data

Sep. 26, 2000 (JP) ............................. 2000-291583

(51) Int. Cl.
  *H04N 1/48* (2006.01)
  *H04N 1/60* (2006.01)
(52) U.S. Cl. ................... 358/1.9; 358/518; 358/523
(58) Field of Classification Search .............. 358/1.9, 358/1.15, 518, 521, 520, 523; 355/1.18; 382/162, 167; 348/231.3, 231.6, 207.1
See application file for complete search history.

(56) References Cited

U.S. PATENT DOCUMENTS

| | | | | |
|---|---|---|---|---|
| 5,394,523 A * | 2/1995 | Harris | ........................ | 345/501 |
| 5,416,890 A * | 5/1995 | Beretta | ........................ | 345/590 |
| 5,517,335 A * | 5/1996 | Shu | ............................ | 358/518 |
| 5,699,489 A * | 12/1997 | Yokomizo | ................... | 358/1.9 |
| 6,075,888 A * | 6/2000 | Schwartz | ................... | 382/167 |
| 6,603,483 B1* | 8/2003 | Newman | .................... | 345/593 |
| 6,643,029 B1* | 11/2003 | Kumada et al. | ............. | 358/1.9 |
| 6,693,718 B1* | 2/2004 | Takaoka | .................... | 358/1.15 |
| 6,829,058 B1* | 12/2004 | Kumada | .................... | 358/1.15 |
| 2003/0112334 A1* | 6/2003 | Kiyokawa | ............... | 348/231.6 |

FOREIGN PATENT DOCUMENTS

| JP | 5-91307 A | 4/1993 |
|---|---|---|
| JP | 11-177754 | 7/1999 |
| JP | 2003070005 A * | 3/2003 |

* cited by examiner

Primary Examiner—Scott A. Rogers
(74) Attorney, Agent, or Firm—Buchanan Ingersoll & Rooney PC

(57) ABSTRACT

When a color original is scanned by a scanner connected to a network environment, the number of bright pixels and the number of dark pixels within the image data are calculated, and according to the calculated results, one of the color information files for highlight, shadow and standard is selected. The selected file is attached to the scanned data, and sent to an external personal computer or the like. The personal computer uses the selected file to perform color conversion of the scanned data. Accordingly, color conversion in accordance with brightness of an image is enabled.

13 Claims, 10 Drawing Sheets

| DATA | | | CHROMATICITY | | |
|---|---|---|---|---|---|
| R | G | B | L* | a* | b* |
| 0 | 0 | 0 | 90 | 2 | 3 |
| 0 | 31 | 0 | 80 | 4 | 4 |
| . | . | . | . | . | . |
| . | . | . | . | . | . |
| . | . | . | . | . | . |
| 0 | 255 | 0 | 40 | 50 | -10 |

| DATA | | | | CHROMATICITY | | |
|---|---|---|---|---|---|---|
| Y | M | C | K | L* | a* | b* |
| 0 | 0 | 0 | 0 | 90 | 2 | 3 |
| 0 | 10 | 0 | 0 | 80 | 4 | 4 |
| . | . | . | . | . | . | . |
| . | . | . | . | . | . | . |
| . | . | . | . | . | . | . |
| 0 | 100 | 0 | 0 | 40 | 50 | -10 |

F I G. 6
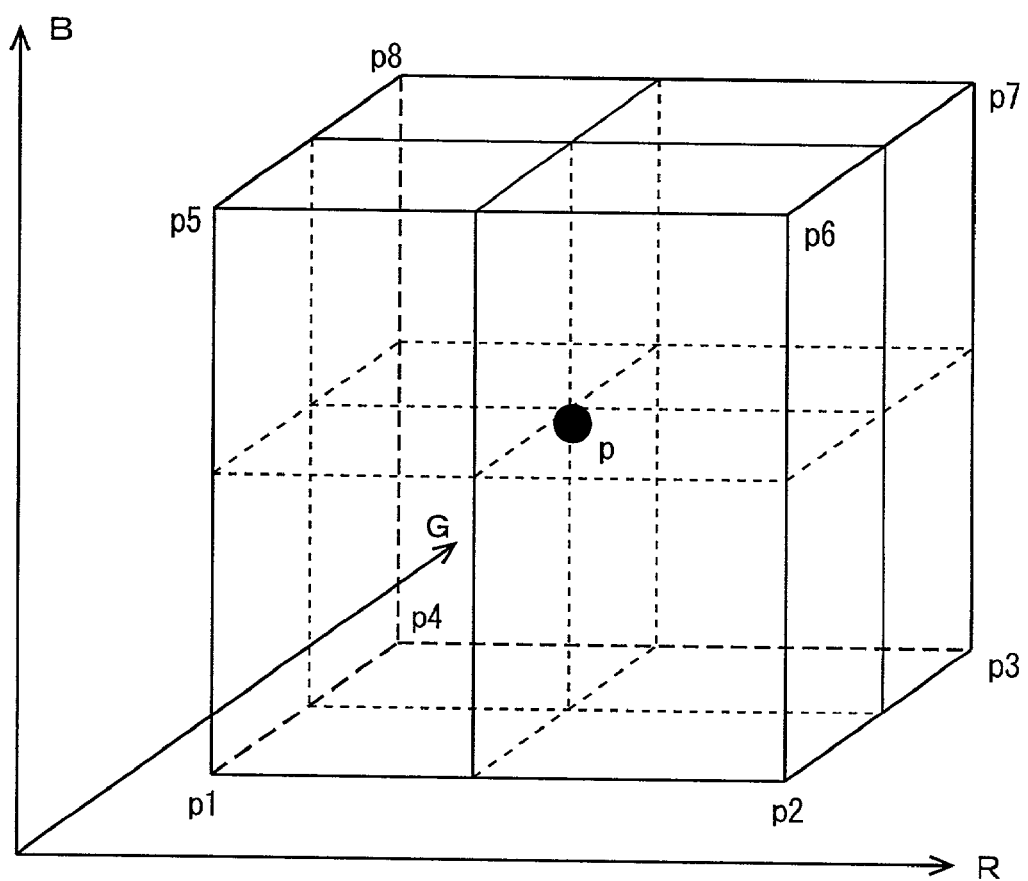

F I G. 7
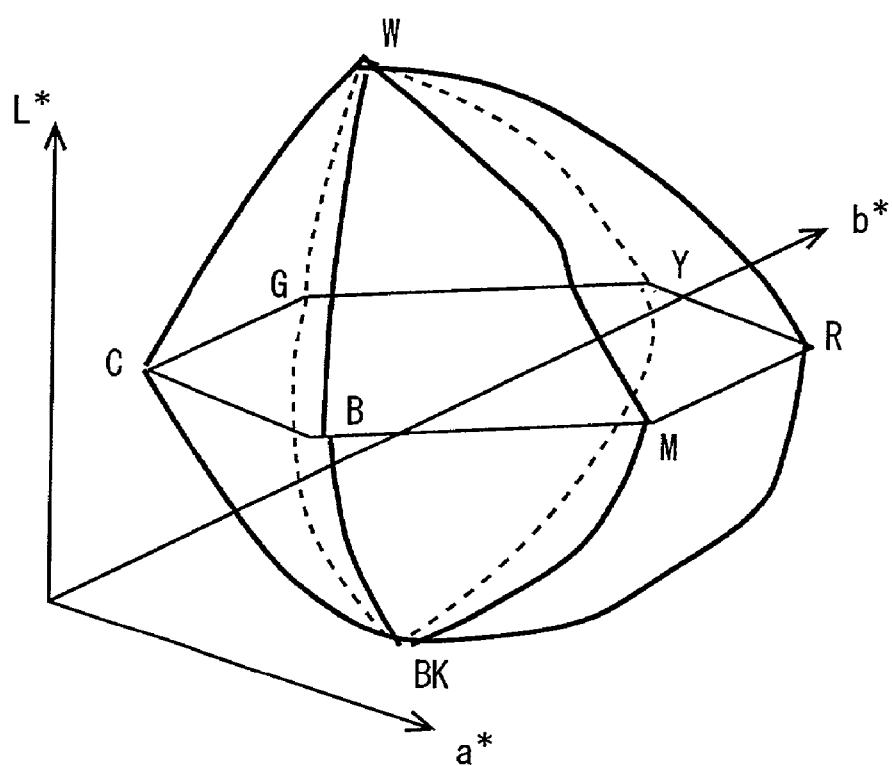

FIG. 9

STANDARD:

| No. | R | G | B | No. | R | G | B |
|---|---|---|---|---|---|---|---|
| 1 | 0 | 0 | 0 | 33 | 0 | 0 | 170 |
| 2 | 0 | 85 | 0 | 34 | 0 | 85 | 170 |
| 3 | 0 | 170 | 0 | 35 | 0 | 170 | 170 |
| 4 | 0 | 255 | 0 | 36 | 0 | 255 | 170 |
| 5 | 85 | 0 | 0 | 37 | 85 | 0 | 170 |
| 6 | 85 | 85 | 0 | 38 | 85 | 85 | 170 |
| 7 | 85 | 170 | 0 | 39 | 85 | 170 | 170 |
| 8 | 85 | 255 | 0 | 40 | 85 | 255 | 170 |
| 9 | 170 | 0 | 0 | 41 | 170 | 0 | 170 |
| 10 | 170 | 85 | 0 | 42 | 170 | 85 | 170 |
| 11 | 170 | 170 | 0 | 43 | 170 | 170 | 170 |
| 12 | 170 | 255 | 0 | 44 | 170 | 255 | 170 |
| 13 | 255 | 0 | 0 | 45 | 255 | 0 | 170 |
| 14 | 255 | 85 | 0 | 46 | 255 | 85 | 170 |
| 15 | 255 | 170 | 0 | 47 | 255 | 170 | 170 |
| 16 | 255 | 255 | 0 | 48 | 255 | 255 | 170 |
| 17 | 0 | 0 | 85 | 49 | 0 | 0 | 255 |
| 18 | 0 | 85 | 85 | 50 | 0 | 85 | 255 |
| 19 | 0 | 170 | 85 | 51 | 0 | 170 | 255 |
| 20 | 0 | 255 | 85 | 52 | 0 | 255 | 255 |
| 21 | 85 | 0 | 85 | 53 | 85 | 0 | 255 |
| 22 | 85 | 85 | 85 | 54 | 85 | 85 | 255 |
| 23 | 85 | 170 | 85 | 55 | 85 | 170 | 255 |
| 24 | 85 | 255 | 85 | 56 | 85 | 255 | 255 |
| 25 | 170 | 0 | 85 | 57 | 170 | 0 | 255 |
| 26 | 170 | 85 | 85 | 58 | 170 | 85 | 255 |
| 27 | 170 | 170 | 85 | 59 | 170 | 170 | 255 |
| 28 | 170 | 255 | 85 | 60 | 170 | 255 | 255 |
| 29 | 255 | 0 | 85 | 61 | 255 | 0 | 255 |
| 30 | 255 | 85 | 85 | 62 | 255 | 85 | 255 |
| 31 | 255 | 170 | 85 | 63 | 255 | 170 | 255 |
| 32 | 255 | 255 | 85 | 64 | 255 | 255 | 255 |

F I G. 1 0

SHADOW EMPHASIZED:

| No. | R | G | B | No. | R | G | B |
|---|---|---|---|---|---|---|---|
| 1 | 0 | 0 | 0 | 33 | 0 | 0 | 85 |
| 2 | 0 | 42 | 0 | 34 | 0 | 42 | 85 |
| 3 | 0 | 85 | 0 | 35 | 0 | 85 | 85 |
| 4 | 0 | 255 | 0 | 36 | 0 | 255 | 85 |
| 5 | 42 | 0 | 0 | 37 | 42 | 0 | 85 |
| 6 | 42 | 42 | 0 | 38 | 42 | 42 | 85 |
| 7 | 42 | 85 | 0 | 39 | 42 | 85 | 85 |
| 8 | 42 | 255 | 0 | 40 | 42 | 255 | 85 |
| 9 | 85 | 0 | 0 | 41 | 85 | 0 | 85 |
| 10 | 85 | 42 | 0 | 42 | 85 | 42 | 85 |
| 11 | 85 | 85 | 0 | 43 | 85 | 85 | 85 |
| 12 | 85 | 255 | 0 | 44 | 85 | 255 | 85 |
| 13 | 255 | 0 | 0 | 45 | 255 | 0 | 85 |
| 14 | 255 | 42 | 0 | 46 | 255 | 42 | 85 |
| 15 | 255 | 85 | 0 | 47 | 255 | 85 | 85 |
| 16 | 255 | 255 | 0 | 48 | 255 | 255 | 85 |
| 17 | 0 | 0 | 42 | 49 | 0 | 0 | 255 |
| 18 | 0 | 42 | 42 | 50 | 0 | 42 | 255 |
| 19 | 0 | 85 | 42 | 51 | 0 | 85 | 255 |
| 20 | 0 | 255 | 42 | 52 | 0 | 255 | 255 |
| 21 | 42 | 0 | 42 | 53 | 42 | 0 | 255 |
| 22 | 42 | 42 | 42 | 54 | 42 | 42 | 255 |
| 23 | 42 | 85 | 42 | 55 | 42 | 85 | 255 |
| 24 | 42 | 255 | 42 | 56 | 42 | 255 | 255 |
| 25 | 85 | 0 | 42 | 57 | 85 | 0 | 255 |
| 26 | 85 | 42 | 42 | 58 | 85 | 42 | 255 |
| 27 | 85 | 85 | 42 | 59 | 85 | 85 | 255 |
| 28 | 85 | 255 | 42 | 60 | 85 | 255 | 255 |
| 29 | 255 | 0 | 42 | 61 | 255 | 0 | 255 |
| 30 | 255 | 42 | 42 | 62 | 255 | 42 | 255 |
| 31 | 255 | 85 | 42 | 63 | 255 | 85 | 255 |
| 32 | 255 | 255 | 42 | 64 | 255 | 255 | 255 |

FIG. 11

HIGHLIGHT EMPHASIZED:

| No. | R | G | B | No. | R | G | B |
|---|---|---|---|---|---|---|---|
| 1 | 0 | 0 | 0 | 33 | 0 | 0 | 212 |
| 2 | 0 | 170 | 0 | 34 | 0 | 170 | 212 |
| 3 | 0 | 212 | 0 | 35 | 0 | 212 | 212 |
| 4 | 0 | 255 | 0 | 36 | 0 | 255 | 212 |
| 5 | 170 | 0 | 0 | 37 | 170 | 0 | 212 |
| 6 | 170 | 170 | 0 | 38 | 170 | 170 | 212 |
| 7 | 170 | 212 | 0 | 39 | 170 | 212 | 212 |
| 8 | 170 | 255 | 0 | 40 | 170 | 255 | 212 |
| 9 | 212 | 0 | 0 | 41 | 212 | 0 | 212 |
| 10 | 212 | 170 | 0 | 42 | 212 | 170 | 212 |
| 11 | 212 | 212 | 0 | 43 | 212 | 212 | 212 |
| 12 | 212 | 255 | 0 | 44 | 212 | 255 | 212 |
| 13 | 255 | 0 | 0 | 45 | 255 | 0 | 212 |
| 14 | 255 | 170 | 0 | 46 | 255 | 170 | 212 |
| 15 | 255 | 212 | 0 | 47 | 255 | 212 | 212 |
| 16 | 255 | 255 | 0 | 48 | 255 | 255 | 212 |
| 17 | 0 | 0 | 170 | 49 | 0 | 0 | 255 |
| 18 | 0 | 170 | 170 | 50 | 0 | 170 | 255 |
| 19 | 0 | 212 | 170 | 51 | 0 | 212 | 255 |
| 20 | 0 | 255 | 170 | 52 | 0 | 255 | 255 |
| 21 | 170 | 0 | 170 | 53 | 170 | 0 | 255 |
| 22 | 170 | 170 | 170 | 54 | 170 | 170 | 255 |
| 23 | 170 | 212 | 170 | 55 | 170 | 212 | 255 |
| 24 | 170 | 255 | 170 | 56 | 170 | 255 | 255 |
| 25 | 212 | 0 | 170 | 57 | 212 | 0 | 255 |
| 26 | 212 | 170 | 170 | 58 | 212 | 170 | 255 |
| 27 | 212 | 212 | 170 | 59 | 212 | 212 | 255 |
| 28 | 212 | 255 | 170 | 60 | 212 | 255 | 255 |
| 29 | 255 | 0 | 170 | 61 | 255 | 0 | 255 |
| 30 | 255 | 170 | 170 | 62 | 255 | 170 | 255 |
| 31 | 255 | 212 | 170 | 63 | 255 | 212 | 255 |
| 32 | 255 | 255 | 170 | 64 | 255 | 255 | 255 |

IMAGE PROCESSING APPARATUS, METHOD AND PROGRAM ENABLING HIGH-PRECISION COLOR CONVERSION

This application is based on application No. 2000-291583 filed in Japan, the content of which is hereby incorporated by reference.

BACKGROUND OF THE INVENTION

1. Field of the Invention

The present invention relates to image processing apparatuses, image processing methods and programs to cause computers to perform image processing. More particularly, the present invention relates to an image processing apparatus, an image processing method and a program to cause a computer to perform image processing that allow high-precision color conversion of an image.

2. Description of the Related Art

Conventionally, a technique for reading an image from an original with a reading device like a scanner, performing color conversion with a computer connected to a network, and outputting the image to a printer or the like is known.

For example, Japanese Patent Laying-Open No. 11-177754 discloses a scanner system in which the system having a plurality of scanners connected to a network determines which scanner to use, in terms of hardware, according to an input condition of the original.

For color conversion of an image, a color information file (or a color conversion file, e.g., an ICC (International Color Consortium) profile) specific to a device is referred to, which is created based on representative colors. The file defines color information specific to the device, and is used for exchanging the color information with another device.

The color conversion file generally stores data of representative colors picked up considerably roughly from a color space that the relevant device is able to reproduce, and data of the corresponding colors in another color space, by correlating the data with each other. Color conversion of the colors having not been picked up are carried out by interpolation. This type of color conversion employing interpolation from roughly picked up colors, however, is disadvantageous because the precision in color conversion is degraded.

For example, if colors R, G and B are represented with 8 bits each, each color can be expressed with 256-step gradation. In the combination of RGB, approximately 16,770,000 colors can be expressed.

To handle these colors, measuring all the 16,770,000 colors and preparing color conversion files (look-up tables) by correlating them with, e.g., L*a*b* data would be unrealistic, since it requires an enormous file capacity. In practice, it is common to pick up each color of RGB every 10 steps of gradation or so to obtain data of less than 1,000 colors, and to prepare color conversion files correlating the obtained data with L*a*b* data. In this case, data of the colors having not been picked up are obtained by interpolation, which often results in insufficient precision for fine color reproduction.

SUMMARY OF THE INVENTION

The present invention is made to solve the problems described above, and its object is to provide an image processing apparatus, an image processing method and a program to cause a computer to execute image processing that allow high-precision color conversion.

To achieve the object, according to an aspect of the present invention, the image processing apparatus includes: a storage device to store at least two color information files having contents different from each other; a selecting unit to select one of the at least two color information files according to brightness of image data; and a sending unit to externally send the selected color information file by attaching the relevant file to the image data.

According to another aspect of the present invention, the image processing program causes a computer to execute processing including: the step of selecting one of at least two color information files having contents different from each other according to brightness of image data; and the step of externally sending the selected color information file by attaching the relevant file to the image data.

According to yet another aspect of the present invention, the image processing method includes: the step of selecting one of at least two color information files having contents different from each other according to brightness of image data; and the step of externally sending the selected color information file by attaching the relevant file to the image data.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 illustrates the process of interpolation.

FIG. 7 illustrates an example of the L*a*b* color space.

FIG. 9 shows data of a chart for use in creating a standard color information file.

FIG. 10 shows data of a chart for use in creating a color information file for shadow.

FIG. 11 shows data of a chart for use in creating a color information file for highlight.

DESCRIPTION OF THE PREFERRED EMBODIMENTS

Figure 1:
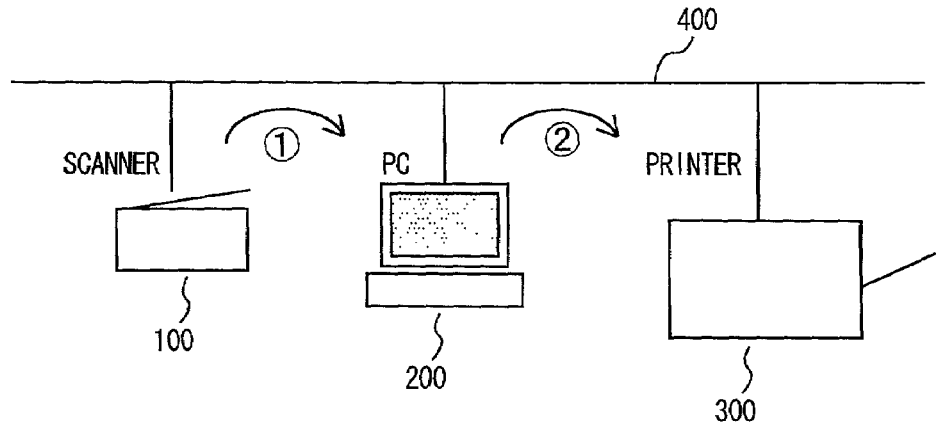
FIG. 1 shows a configuration of the image scan system according to an embodiment of the present invention.

Referring to FIG. 1, the image scan system is formed of a scanner 100, a personal computer (PC) 200 and a printer 300, which are connected to each other through a network 400.

Figure 2:
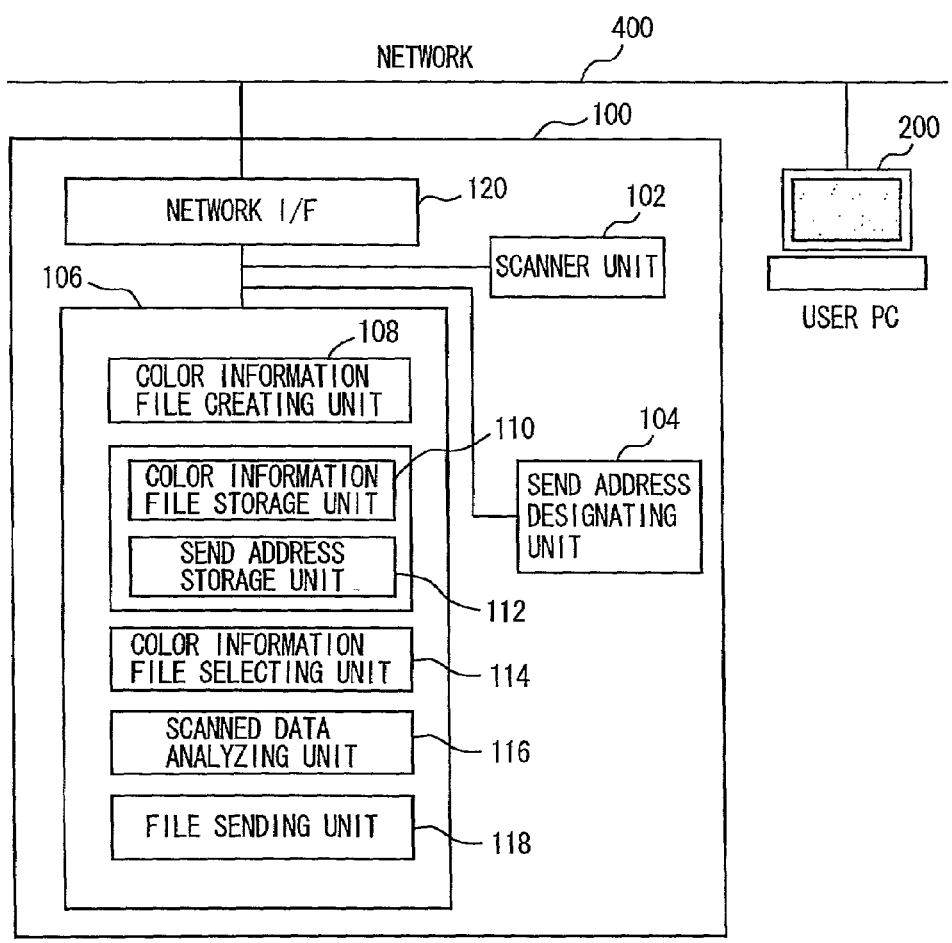
FIG. 2 shows a configuration of the scanner 100 in FIG. 1.

FIG. 2 shows a detailed configuration of scanner 100 shown in FIG. 1. Referring to FIG. 2, scanner 100 includes a network interface 120 for connection with network 400, a scanner unit 102 formed of a charge coupled device (CCD) or the like for reading an image from an original, a send address designating unit 104 for designating an address to which image data obtained by scanning is to be sent, and a processing unit 106 for analyzing the image data obtained by the scanning, creating color information files (also referred to as color conversion files) from the data obtained by the scanning, and selecting and sending an optimum color information file.

Processing unit 106 includes a color information file creating unit 108 for creating a color information file from the read data, a color information file storage unit 110 for storing at least two such color information files created, a send address storage unit 112 for storing an address to which the color information file is to be sent together with the image data, a color information file selecting unit 114 for selecting an optimum color information file based on a result of analysis of the image data obtained by scanning, a scanned data analyzing unit 116 for analyzing the image data obtained by the scanning, and a file sending unit 118 for sending the color information file with the image data. Color information file storage unit 110 and send address storage unit 112 are each formed of a storage device such as a hard disk.

Scanner 100 having such a configuration is usually called a network scanner. That is, a single scanner 100 is shared by users on network 400. For example, a user inputs an address of his/her own personal computer from a liquid crystal monitor of scanner 100, and presses a scan button provided at the body of scanner 100. The image data obtained by scanning is then captured to the user's personal computer via network 400 (the process shown with an arrow (1) in FIG. 1).

At this time, a color information file of the scanner 100 is attached to the image data and sent to the personal computer. This color information file serves as reference data for reproduction of the identical colors with another device.

The present embodiment is advantageous in that, when image data obtained by scanner 100 is being sent together with the color information file specific to the device, an optimum color information file is automatically selected from a plurality of color information files prepared, according to the relevant image data.

It is noted that color information file storage unit 110 shown in FIG. 2 may store in advance a plurality of customized color information files, besides the color information files created by color information file creating unit 108.

Figure 3:
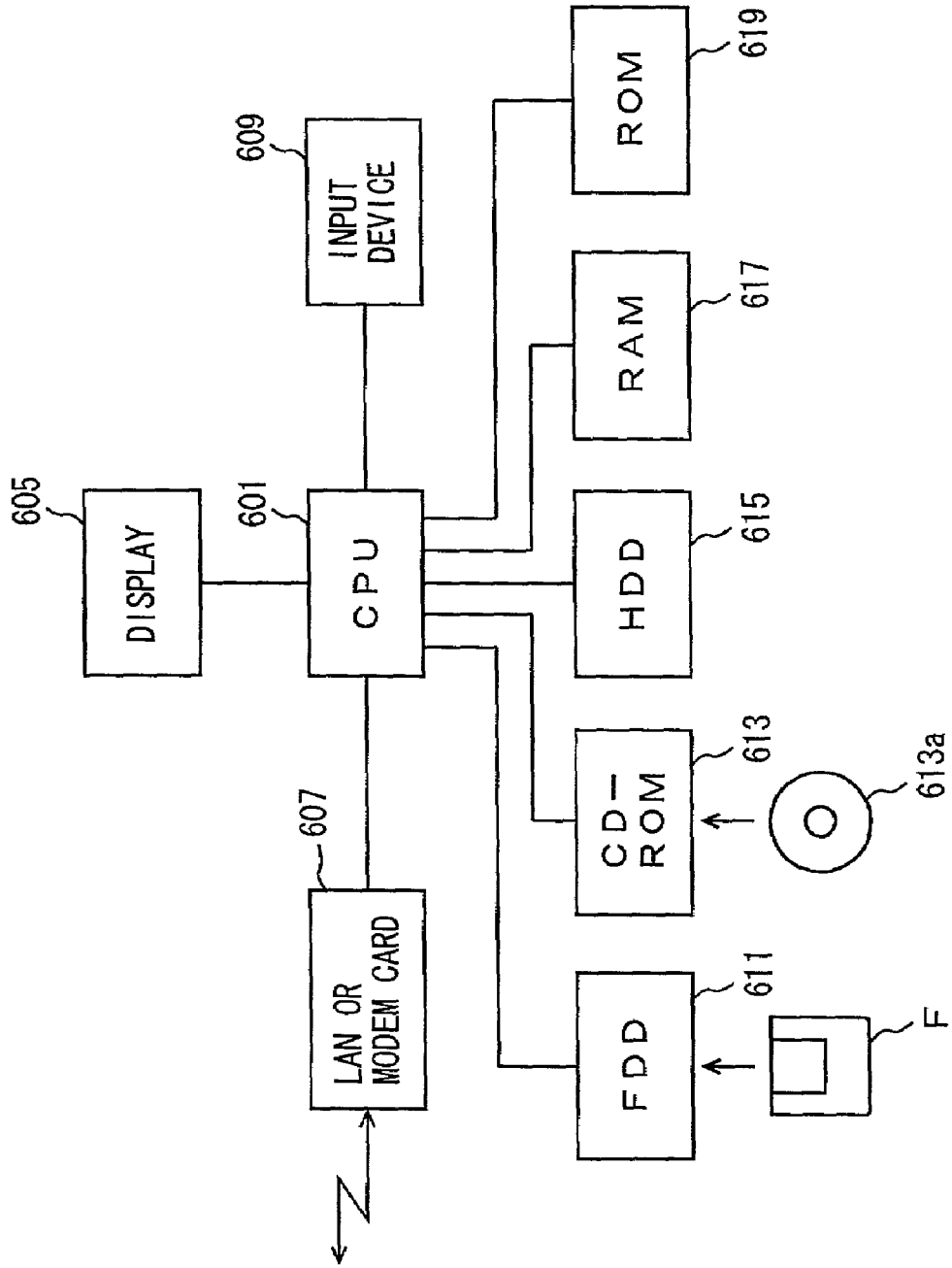
FIG. 3 shows a configuration of the personal computer 200 in FIG. 1.

FIG. 3 shows a configuration of personal computer 200 in FIG. 1.

Referring to FIG. 3, personal computer 200 includes a central processing unit (CPU) 601 for performing an overall control of the device, a display 605 for displaying an image or text data, a local area network (LAN) or modem card 607 for connection with network 400 or the like, an input device 609 formed of keyboard, mouse or the like, a flexible disk drive 611, a compact disc-read only memory (CD-ROM) drive 613, a hard disk drive 615, a random access memory (RAM) 617, and a ROM 619.

Flexible disk drive 611 can read data or a program recorded on a flexible disk F. CD-ROM drive 613 can read data or a program recorded on a CD-ROM 613*a*. A program for execution of the process that will be described below with reference to a flow chart can be provided by flexible disk F or CD-ROM 613*a*. Alternatively, the program may be recorded on hard disk (driven by hard disk drive 615), RAM 617, ROM 619 or other storage mediums including a memory card.

Figures 4, 5:
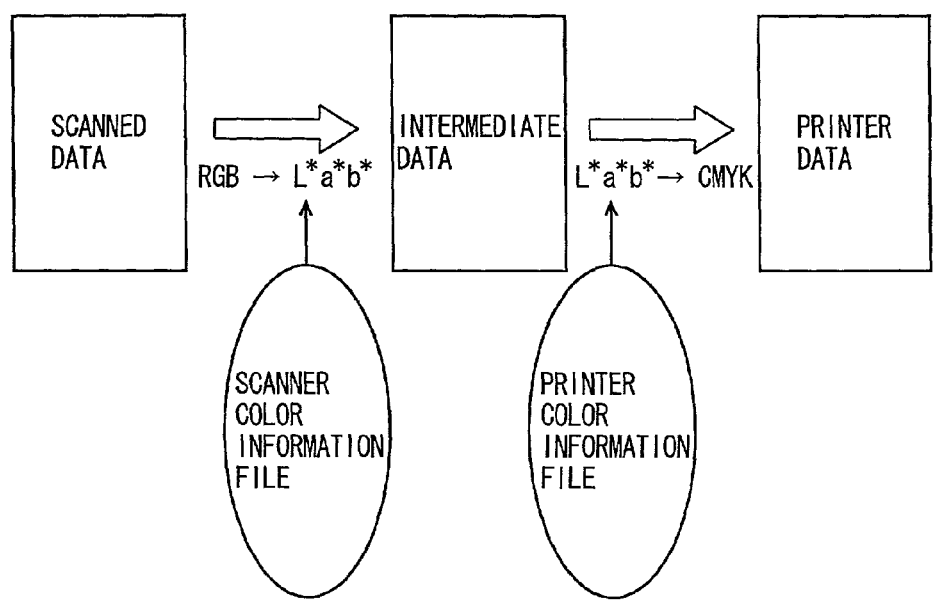
FIG. 4 illustrates the contents of the color conversion process conducted by personal computer 200.
FIG. 5 shows examples of the color conversion file.

FIG. 4 illustrates the color conversion process being conducted in personal computer 200. First, personal computer 200 processes received image data (scanned data) using a scanner color information file also received, to create intermediate data. Herein, assume that the image data is RGB data and the intermediate data is L*a*b* data.

Next, personal computer 200 converts the intermediate data into image data for printer (printer data) using a printer color information file representing the characteristics of printer 300. In this example, the printer data is assumed to be CMYK data.

One of the representative color information files is an ICC profile. The color information files including the ICC profile are standardized by The International Color Consortium. Using the color information files, it is possible to describe the color characteristics of display, scanner, digital camera, printer and others.

FIG. 5 shows examples of such a color information file. The table on the left side of FIG. 5 is a scanner color information file (RGB→L*a*b*), and the table on the right side is a printer color information file (L*a*b*→YMCK).

As shown in FIG. 5, each color information file does not store data corresponding to all the colors; it only stores data corresponding to representative colors.

Thus, as explained above, interpolation is carried out for conversion of the colors not recorded on the color conversion file. Hereinafter, the interpolation effected for converting RGB data to L*a*b* data will be described.

Referring to FIG. 6, it is assumed that image data ($R_P$, $G_P$, $B_P$) of a point p within the RGB color space, which is not recorded on a color conversion file, is to be converted to L*a*b* data. In this case, of the colors registered on the color information file in advance, those at the points in the vicinity of the point p as a target of conversion are referred to, and L*a*b* values (intermediate data) corresponding thereto are found. (In the example of FIG. 6, the L*a*b* values are found for the colors at points p1–p8 surrounding point p.)

Here, assume that, when the RGB data at point p is ($R_P$, $G_P$, $B_P$), the image data at points p1–p8 are as follows:

p1=($R_1$, $G_1$, $B_1$)
p2=($R_{1+1}$, $G_1$, $B_1$)
p3=($R_{1+1}$, $G_{1+1}$, $B_1$)
p4=($R_1$, $G_{1+1}$, $B_1$)
p5=($R_1$, $G_1$, $B_{1+1}$)
p6=($R_{1+1}$, $G_1$, $B_{1+1}$)
p7=($R_{1+1}$, $G_{1+1}$, $B_{1+1}$)
p8=($R_1$, $G_{1+1}$, $B_{1+1}$)

where $R_1 \leq R_P \leq R_{1+1}$, $G_1 \leq G_P \leq G_{1+1}$, and $B_1 \leq B_P \leq B_{1+1}$.

Then, the L*a*b* value at point p can be calculated as follows:

$$Lp^* = \sum_{i=1}^{8} wi\, Li^*$$

$$ap^* = \sum_{i=1}^{8} wi\, ai^*$$

$$bp^* = \sum_{i=1}^{8} wi\, bi^*$$

wherein Li*, ai* and bi* (i=1–8) are the L*, a* and b* values corresponding to the (R, G, B) data at the lattice points p1–p8, and wi represent weighting factors of respective points p1–p8, which are calculated as follows:

w1=(1−r) (1−g) (1−b)
w2=r(1−g) (1−b)

w3=r g(1−b)
w4=(1−r) g (1−b)
w5=(1−r) (1−g)b
w6=r(1−g)b
w7=r g b
w8=(1−r)g b where $r=(R_P−R_1)/(R_{1+1}−R_1)$
$g=(G_P−G_1)/(G_{1+1}−G_1)$
$b=(B_P−B_1)/(B_{1+1}−B_1)$ When the L*a*b* values of point p are obtained, CMYK data for outputting the equivalent values is calculated back from, e.g., a printer color information file (see FIGS. 4 and 5). Such data conversion is generally conducted on a personal computer.

The method for creating the color information file by color information file creating unit 108 will now be described in brief.

For creation of the color information file, in the case of a scanner, for example, a color chart (a sheet on which a plurality of colors (color patches) are depicted) is first read by the scanner. The color patches are separately measured by a colorimeter. A look-up table (LUT) is then created wherein the L*a*b* values of the calorimetrically obtained data are correlated with digital 3-signal values R, G, B (of, e.g., 8 bits each) being response characteristics (output signals) of the relevant scanner (see FIG. 5). This look-up table constitutes the color information file.

Here, the L*a*b* is a standard for expressing color with three-dimensional orthogonal coordinates, set by The International Commission on Illumination (CIE).

FIG. 7 schematically shows the L*a*b* color space. In FIG. 7, the portion surrounded by W, BK, Y, M, C, R, G and B corresponds to a color reproduction range being expressed on a paper. W, BK, Y, R, M, B, C and G represent the color saturated portions of white, black, yellow, red, magenta, blue, cyan and green, respectively. In FIG. 7, an image becomes brighter as the numerical value of the L* axis increases (L* is larger), whereas the image becomes darker as the numerical value of the L* axis decreases (L* is smaller). Almost all the color management systems at present employ the L*a*b* color space as the base.

Figure 8:
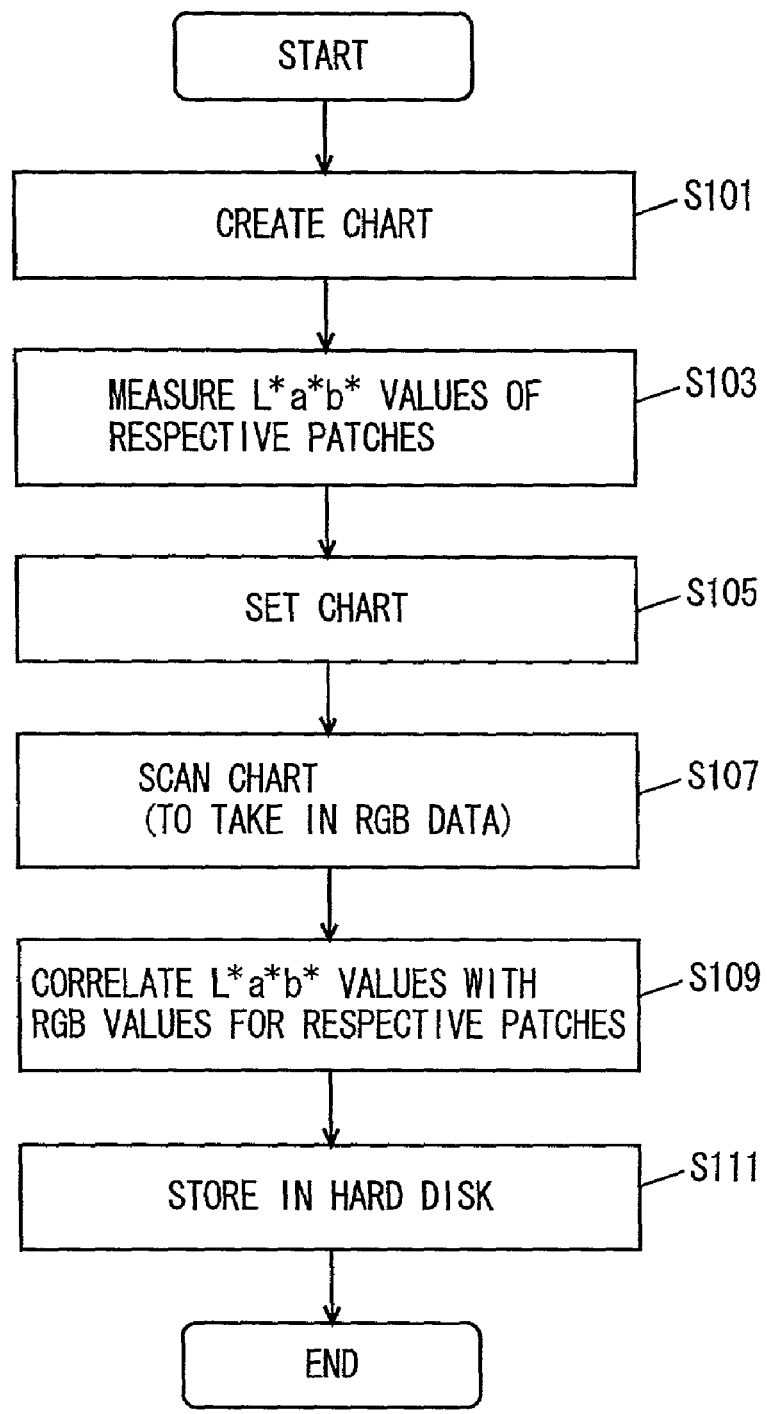
FIG. 8 is a flow chart illustrating the process of creating and registering a color conversion file.

FIG. 8 is a flow chart illustrating the color information file creating process to be done by color information file creating unit 108 in scanner 100 according to the present embodiment. The relevant process is executed by color information file creating unit 108 according to the program stored in a storage device such as ROM, hard disk or the like, not shown.

Referring to FIG. 8, in step S101, a user creates a color chart (a sheet having color patches depicted thereon) by outputting image data to a silver salt photo printer, for example. Here, a chart commercially available may be used as a standard chart.

When the chart is being output by the silver salt photo printer, data for use in creating the chart, as shown in FIG. 9, is employed.

Referring to FIG. 9, in this example, 64 color patches No. 1–64 are to be printed to form the chart. In FIG. 9, RGB colors are expressed with 8 bits each (0–255). R, G and B each take one of four values of 0, 85, 170 and 255, and the chart data are created by combination thereof.

Specifically, since R, G and B each take four kinds of values, 4×4×4=64 color patches are created. The RGB values (0–255) represent brighter colors as they approach from 0 to 255.

In the chart data shown in FIG. 9, the RGB values are each set to 0, 85, 170 or 255. Therefore, colors at the points that separate the RGB color space approximately evenly are recorded on the color information file as data. Thus, the color conversion file created based on the chart data of FIG. 9 is called a "standard color information file".

FIG. 10 shows chart data for use in creating a color information file for shadow, or a "shadow color information file".

In this example, the chart data are created by combination of RGB each taking four values of 0, 42, 85 and 255. That is, the number of patches corresponding to the dark portion is increased compared to the chart obtained from the chart data in FIG. 9. Accordingly, a color information file having data of the dark portion finely segmented and data of the bright portion roughly segmented within the RGB color space can be created.

Since the number of patches in FIG. 10 is again 64 (No. 1–64), it is possible to create the shadow color information file with the same capacity as the standard color information file.

The shadow color information file is suitable for use in conversion of a dark image, since it enables high-precision conversion of dark colors.

FIG. 11 shows chart data for creating a color information file for highlight, or a "highlight color information file".

In this example, the chart is to be created from the combination of RGB each taking four values of 0, 170, 212 and 255. That is, the number of patches corresponding to the bright portion is increased compared to the chart obtained from the data in FIG. 9. Accordingly, a color information file can be created which includes data of the bright portion finely segmented and the dark portion roughly segmented within the RGB color space.

Again in FIG. 11, 64 patches No. 1–64 are prepared. Thus, the highlight color information file can be created with the same capacity as the standard color information file. The highlight color information file is suitable for conversion of a bright image, since it allows high-precision conversion of bright colors.

Returning to FIG. 8, in step S103, a colorimeter is used to measure the colors of patches in the respective color charts, to obtain the L*a*b* values thereof. Each color chart is set to a scanner in step S105 and scanned in step S107, whereby the RGB data of the respective patches are taken in. In step S109, the RGB data and the L*a*b* data of the respective patches are correlated with each other, so that a scanner color information file (the table on the left in FIG. 5) is created. The three kinds of color information files thus created based on the chart data shown in FIGS. 9–11 are stored in color information file storage unit 110 (hard disk or the like) in step S111.

Figure 12:
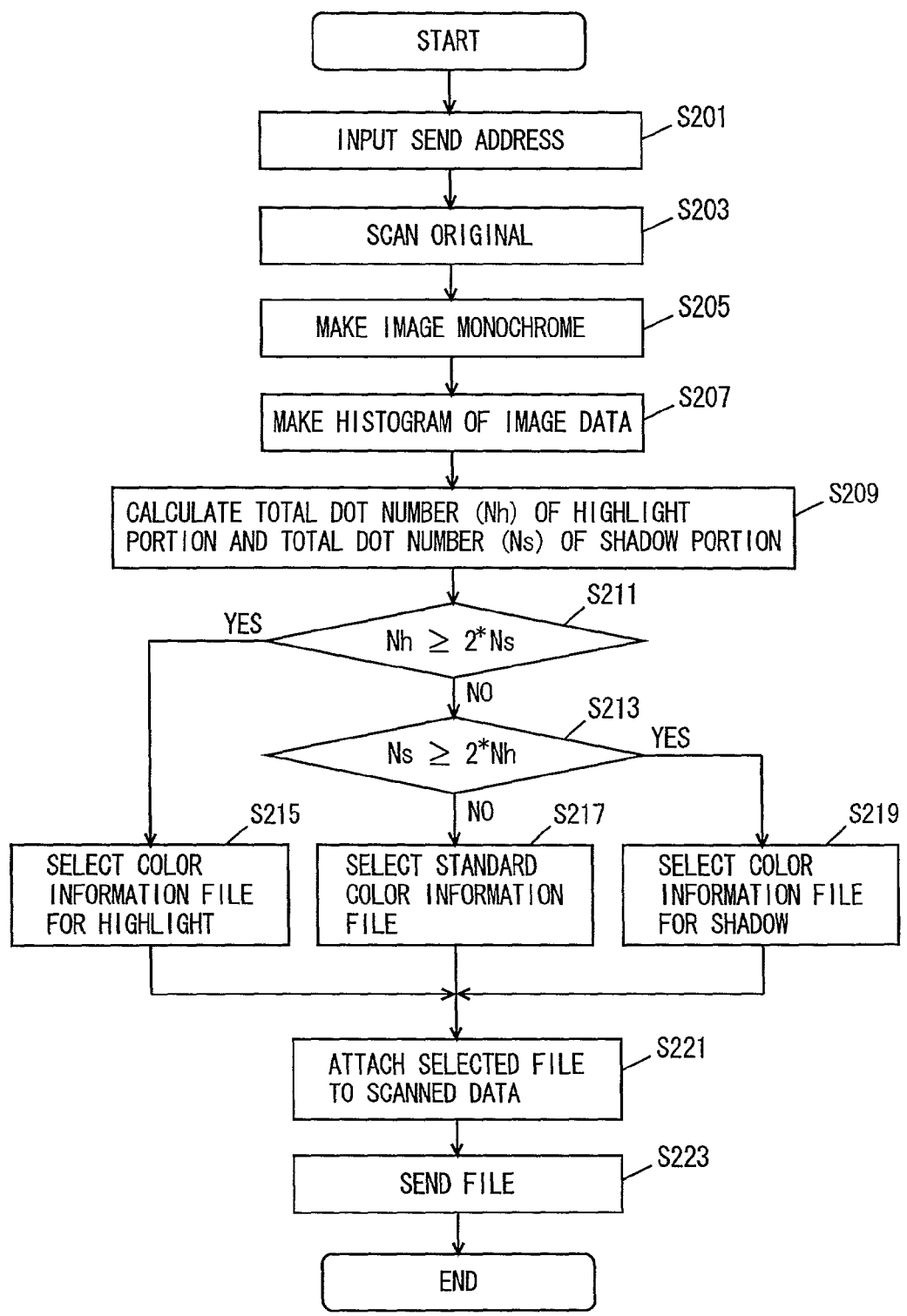
FIG. 12 is a flow chart illustrating the color conversion process.

FIG. 12 is a flow chart of the color conversion process. Illustrated representatively in this flow chart is the case where the data taken by a user via network scanner 100 is being output from printer 300 (corresponding to the case of copying using the network). The relevant process is executed by portions of processing unit 106 (in practice, a processor of a microcomputer or the like) according to a program stored in a storage device like ROM or hard disk (not shown).

Referring to FIG. 12, a user places an original on scanner 100, for example, and inputs or selects the address of his/her own personal computer 200 through a liquid crystal panel (S201). Thereafter, the user presses a scan button provided at scanner 100, so that the original is scanned (S203). As the address of the personal computer being input by a user, an IP address of TCP/IP protocol or others may be employed.

The image data read by scanning is subjected to color separation at scanner 100, and converted to RGB data of, e.g., 8 bits each. In scanner 100, the RGB color data is converted to monochrome data of 8 bits for image analysis (S205). Various kinds of methods are known for such conversion to monochrome data, and thus, description thereof is not provided here.

Next, pixels of the monochrome image data are separated to two portions of shadow and highlight to create a histogram (S207). The numbers of pixels belonging to the shadow and highlight portions are then calculated, respectively (S209).

Herein, the pixels having image data in a range of 0–127 correspond to the shadow portion, and the total number of pixels therein is represented as Ns. Those having image data in a range of 128–255 correspond to the highlight portion, and the total number of pixels therein is represented as Nh.

If the total pixel number in the highlight portion (Nh) is at least twice the total pixel number in the shadow portion (Ns), or if the condition Nh≧2*Ns is satisfied (Yes in S211), then the highlight color information file is selected from the color information files stored in color information file storage unit 110 (S215). On the contrary, if the total pixel number in the shadow portion (Ns) is at least twice the total pixel number in the highlight portion (Nh), or if Ns≧2*Nh (Yes in S213), then the shadow color information file is selected from color information file storage unit 110 (S219). If neither one is satisfied, the standard color information file having the colors evenly spaced is selected (S217).

The selected color information file is attached to the scanned image data (S221), and sent via network 400 to an address designated in step S201 (S223, corresponding to the process shown with the arrow (1) in FIG. 1).

A user then selects a profile for an output device (printer or the like) that he/she wishes to use at personal computer 200, for example, and converts the RGB image data via the intermediate data to CMYK image data for the output device (FIG. 4). The converted CMYK image data is sent via the network or the like to the relevant output device (corresponding to the process shown with an arrow (2) in FIG. 1). Accordingly, the scanned image data is duplicated.

As explained above, according to the present embodiment, at the time when sending an image read by a scanner, a color conversion file optimal for the image is selected according to the characteristics of the image. Thus, the color conversion of the image can be done with higher precision than in the conventional case.

In the embodiment described above, three kinds of color information files for standard, shadow and highlight have been created. However, the number of the color conversion files is not limited to three. The present invention is applicable to any case where at least two kinds of files are being prepared.

Further, in the description above, the processes have been effected using software. Alternatively, hardware circuits may be used to effect the processes.

Still further, in the description above, the color conversion file has been created by scanner 100. Alternatively, the color conversion file may be prestored in scanner 100, or it may be taken in via network 400 and stored in scanner 100.

The present invention is also applicable to the case where color conversion is effected by a device unconnected to a network environment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus, comprising:
a storage device to store at least two color information files having contents different from each other;
selector selecting one of said at least two color information files according to brightness of image data; and
sending device externally sending said selected color information file by attaching said file to said image data.

2. The image processing apparatus according to claim 1, wherein said selector determines the brightness of said image data based on a number of bright pixels having luminance brighter than a prescribed luminance value and a number of dark pixels having luminance darker than said prescribed luminance value.

3. The image processing apparatus according to claim 2, wherein
said at least two color information files include a color information file for highlight that is suitable for conversion processing of a bright image, and a color information file for shadow that is suitable for the conversion processing of a dark image, and
said selector selects said color information file for highlight when the number of said bright pixels is greater than the number of said dark pixels by a prescribed amount, and selects said color information file for shadow when the number of said dark pixels is greater than the number of said bright pixels by a prescribed amount.

4. The image processing apparatus according to claim 1, further comprising color information creating device creating said at least two color information files.

5. The image processing apparatus according to claim 1, further comprising reading device reading an original to generate said image data.

6. A computer readable medium storing an image processing program to cause a computer to execute processing comprising the steps of:
selecting one of at least two color information files having contents different from each other, according to brightness of image data; and
externally sending said selected color information file by attaching said file to said image data.

7. The computer readable medium according to claim 6, wherein said selecting step includes the step of determining the brightness of said image data based on a number of bright pixels having luminance brighter than a prescribed luminance value and a number of dark pixels having luminance darker than said prescribed luminance value.

8. The computer readable medium according to claim 7, wherein
said at least two color information files include a color information file for highlight that is suitable for conversion processing of a bright image and a color information file for shadow that is suitable for the conversion processing of a dark image, and
said selecting step includes the step of selecting said color information file for highlight when the number of said bright pixels is greater than the number of said dark pixels by a prescribed amount, and selecting said color information file for shadow when the number of said dark pixels is greater than the number of said bright pixels by a prescribed amount.

9. The computer readable medium according to claim 6, wherein said processing further comprises the step of creating said at least two color information files for storage in a storage device.

10. An image processing method, comprising the steps of:
   selecting one of at least two color information files having contents different from each other, according to brightness of image data; and
   externally sending said selected color information file by attaching said file to said image data.

11. The image processing method according to claim 10, wherein said selecting step includes the step of determining the brightness of said image data based on a number of bright pixels having luminance brighter than a prescribed luminance value and a number of dark pixels having luminance darker than said prescribed luminance value.

12. The image processing method according to claim 11, wherein
   said at least two color information files include a color information files include a color information file for highlight that is suitable for conversion processing of a bright image and a color information file for shadow that is suitable for the conversion processing of a dark image, and
   said selecting step includes the step of selecting said color information file for highlight when the number of said bright pixels is greater than the number of said dark pixels by a prescribed amount, and selecting said color information file for shadow when the number of said dark pixels is greater than the number of said bright pixels by a prescribed amount.

13. The image processing method according to claim 10, further comprising the step of creating said at least two color information files for storage in a storage device.

* * * * *